US009350171B2

(12) United States Patent
Kim et al.

(10) Patent No.: US 9,350,171 B2
(45) Date of Patent: May 24, 2016

(54) TRANSMISSION LINE FOR CAPACITIVE COIL (71) Applicant: KOREA ADVANCED INSTITUTE OF SCIENCE AND TECHNOLOGY, Daejeon (KR)

(72) Inventors: Dang-Oh Kim, Daejeon (KR); Ja-Hyeon Lee, Gwangju (KR); Uoo-Yeol Yoon, Daejeon (KR); Dong-Ho Cho, Daejeon (KR)

(73) Assignee: KOREA ADVANCED INSTITUTE OF SCIENCE, Daejeon (KR)

( * ) Notice: Subject to any disclaimer, the term of this patent is extended or adjusted under 35 U.S.C. 154(b) by 216 days.

(21) Appl. No.: 14/103,982

(22) Filed: Dec. 12, 2013

(65) Prior Publication Data
US 2015/0008010 A1    Jan. 8, 2015

(30) Foreign Application Priority Data

Jul. 2, 2013    (KR) ........................ 10-2013-0077117

(51) Int. Cl.
*H01B 9/04*     (2006.01)
*H02J 3/18*     (2006.01)
*H01G 4/28*     (2006.01)
*H01B 9/00*     (2006.01)

(52) U.S. Cl.
CPC .. *H02J 3/18* (2013.01); *H01G 4/28* (2013.01); *H01B 9/006* (2013.01)

(58) Field of Classification Search
CPC ............ H01B 9/04; H01B 9/006; H01G 4/28; H02J 3/18
USPC ...................................... 174/113 R
See application file for complete search history.

(56) References Cited

U.S. PATENT DOCUMENTS

2012/0234577 A1*    9/2012  Kim et al. ................. 174/113 R

* cited by examiner

*Primary Examiner* — Hoa C Nguyen
*Assistant Examiner* — Amol Patel
(74) *Attorney, Agent, or Firm* — Lex IP Meister, PLLC (57) ABSTRACT

The present invention provides a transmission line for a capacitive coil. The transmission line may include: a plurality of first cylindrical conductors; a plurality of second cylindrical conductors arranged alternately with the first cylindrical conductors in a layered structure; and dielectrics arranged between the first cylindrical conductors and the second cylindrical conductors. According to the present invention, a coaxial cable having multi-layered pairs of cylindrical conductors and dielectrics inserted between the cylindrical conductors or a cable having one or more layers of conductors separated by dielectrics is provided to thereby minimize current loss in a transmission line by compensating for line voltage drop due to self-inductance L of the line.

5 Claims, 8 Drawing Sheets

TRANSMISSION LINE FOR CAPACITIVE COIL

BACKGROUND OF THE INVENTION

1. Field of the Invention

The present invention relates to a transmission line for a capacitive coil and, more particularly, to a transmission line for a capacitive coil that realizes distributed capacitance so as to minimize loss of power in a power cable.

2. Description of the Related Art

As means for pollution prevention and reduction of reliance on petroleum energy, electric vehicles powered by electricity and hybrid vehicles powered selectively by electricity or internal combustion engines have been developed.

Currently, such an electric vehicle and (plug-in) hybrid vehicle should be connected to external power supply equipment through a plug or the like for a longtime to charge batteries and may run only a limited distance on a single charge.

As such, in recent years, electric vehicles using electromagnetic induction have attracted wide attention as an alternative to electric vehicles using batteries.

Electric vehicles using magnetic induction require power feeding roads or rails supplying electricity. Such an electric vehicle or electric train need only run on a power feeding road to draw power. That is, while travelling on a power feeding road, the electric vehicle may draw high-frequency power to drive through electromagnetic induction between power supply lines and power collection equipment installed in the vehicle.

Supplying power to a power feeding road requires a large number of inverters. As inverters become expensive with increasing capacity, efficient electric wiring is needed so that each inverter supplies a small amount of power.

When power supply lines become long, increased self-inductance thereof results in high resistance, hindering flow of current. Hence, supply of a target amount of current necessitates a voltage increase, causing a cost increase. To solve problems due to the length of power supply lines, a large number of resonant capacitors are installed to compensate for a voltage due to inductance in the power supply lines.

Installation of a large number of resonant capacitors may entail difficulty of capacitor arrangement and wiring complexity, and hence the installation process may be delayed and the installation time may be significantly increased. Further, resonant capacitors need additional space according to size thereof and expenses increase according to number thereof.

In Patent document 1 below, a transmission line type component is proposed that may be used as a high-frequency electronic circuit element. The transmission line type component is a single capacitor component, which may be used a high-frequency decoupler in an electronic circuit. The transmission line type component is viewed as a lumped element that is to be selected in consideration of wavelength.

In Patent document 2 below, a Helmholtz type sample coil is used specifically for design of an NMR probe.

RELATED ART DOCUMENTS

Patent Literature (Patent Document 1) KR10-2004-0000454 A
(Patent Document 2) JP2010-190591 A

SUMMARY OF THE INVENTION

The present invention has been made in view of the above problems. Accordingly, an aspect of the present invention is to provide a transmission line for a capacitive coil that can minimize current loss by compensating for line voltage drop due to self-inductance L of the line, and can be configured as a coaxial cable having multi-layered pairs of cylindrical conductors and dielectrics inserted between the cylindrical conductors or as a cable having one or more layers of conductors separated by dielectrics.

In accordance with an aspect of the present invention, a transmission line for a capacitive coil is provided. The transmission line may include: a plurality of first cylindrical conductors; a plurality of second cylindrical conductors arranged alternately with the first cylindrical conductors in a layered structure; and dielectrics arranged between the first cylindrical conductors and the second cylindrical conductors.

In accordance with another aspect of the present invention, a transmission line for a capacitive coil is provided. The transmission line may include: an inner conductor at the center of a cable; a plurality of first outer conductors surrounding the inner conductor; and dielectrics enclosing the inner conductor and the first outer conductors, wherein a plurality of second to n-th outer conductors are formed in a multi-layered structure outside the first outer conductors and the second to n-th outer conductors are individually enclosed by dielectrics.

In a feature of the present invention, a coaxial cable having multi-layered pairs of cylindrical conductors and dielectrics inserted between the cylindrical conductors or a cable having one or more layers of conductors separated by dielectrics is provided to thereby minimize current loss in a transmission line by compensating for line voltage drop due to self-inductance L of the line.

DETAILED DESCRIPTION OF EXEMPLARY EMBODIMENTS

Hereinafter, exemplary embodiments of the present invention are described in detail with reference to the accompanying drawings. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Figure 1:
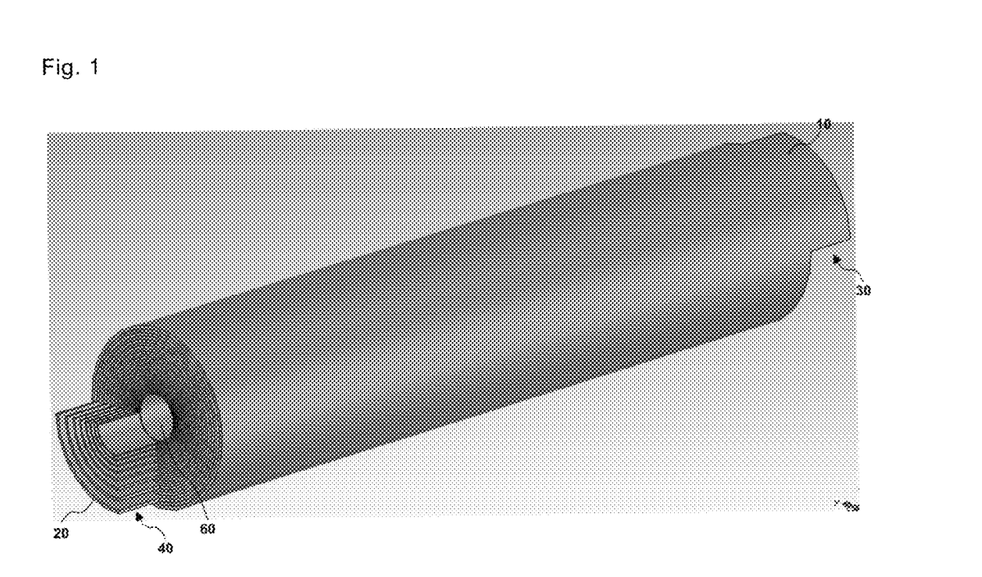
FIG. 1 is an external view of a coaxial cable for a capacitive coil having a layered structure according to an embodiment of the present invention.
Figure 2:
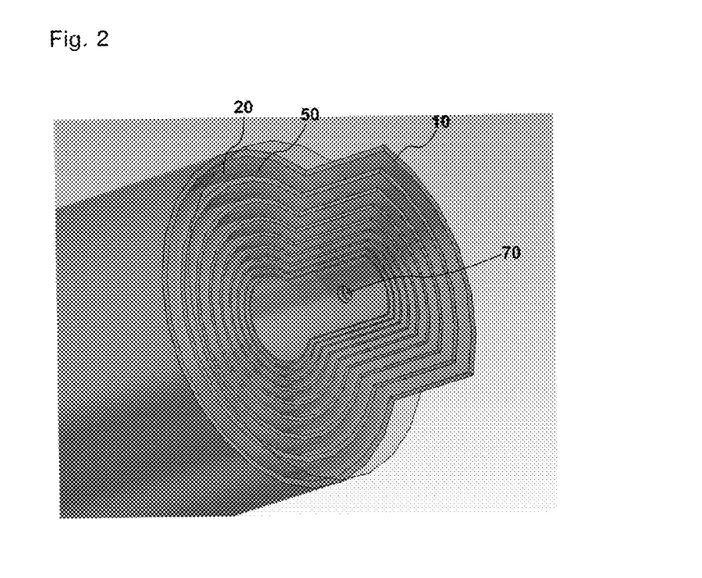
FIG. 2 illustrates a protruding connection part of the cable of FIG. 1, which is used to connect the cable to an external circuit.
Figure 3:
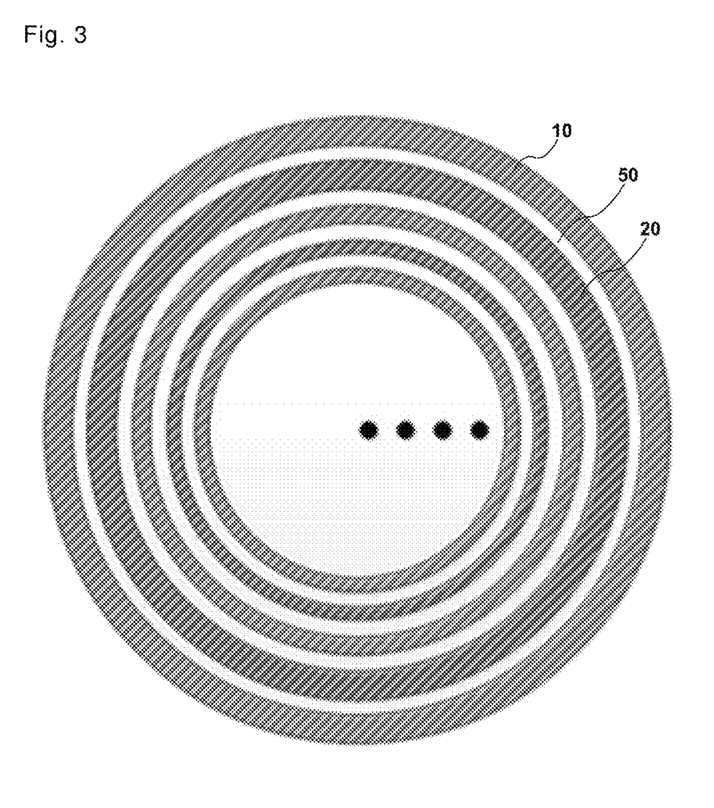
FIG. 3 is a cross sectional view of the coaxial cable having a layered structure shown in FIG. 1.
Figure 4:
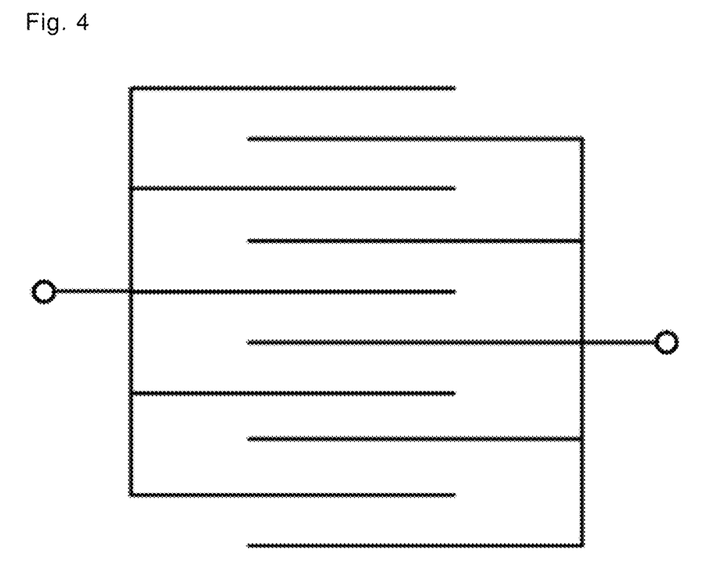
FIG. 4 illustrates an equivalent structure for the coaxial cable having a layered structure shown in FIG. 1.
Figure 5:
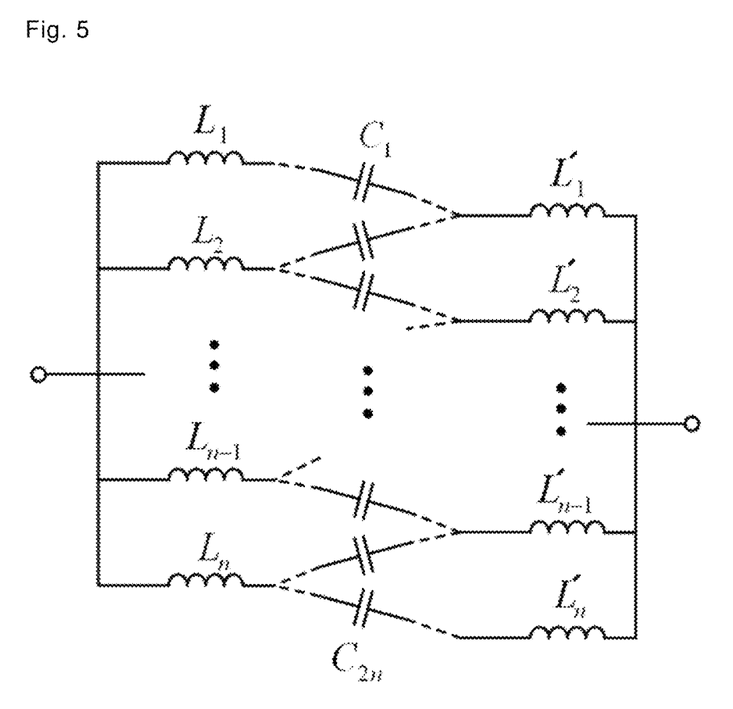
FIG. 5 illustrates an equivalent circuit for the coaxial cable having a layered structure shown in FIG. 1.

FIG. 1 is an external view of a coaxial cable for a capacitive coil having a layered structure according to an embodiment of the present invention; FIG. 2 illustrates a protruding connection part of the cable, which is used to connect the cable to an external circuit; FIG. 3 is a cross sectional view of the coaxial cable; FIG. 4 illustrates an equivalent structure for the coaxial cable; and FIG. 5 illustrates an equivalent circuit for the coaxial cable.

As shown, the coaxial cable for a capacitive coil of the present invention includes multiple pairs of first and second cylindrical conductors 10 and 20 forming a layered structure.

At one end of the coaxial cable, portions of the first cylindrical conductors 10 are protruded to form a first protruding connection part 30 connectable in series or parallel to an external circuit. At the other end of the coaxial cable, portions of the second cylindrical conductors 20 are protruded to form a second protruding connection part 40 connectable in series or parallel to an external circuit.

A dielectric 50 (insulator) is inserted between each pair of the first cylindrical conductor 10 and the second cylindrical conductor 20. The dielectrics 50 between the first cylindrical conductors 10 and the second cylindrical conductors 20 electrically isolate the first protruding connection part 30 connectable in series or parallel to an external circuit from the second protruding connection part 40 connectable in series or parallel to an external circuit.

As shown in FIG. 3, one first cylindrical conductor 10 (orange colored) is paired with one second cylindrical conductor 20 (blue colored), and multiple pairs thereof form a layered structure.

Between each pair of the first cylindrical conductor 10 (orange colored) and the second cylindrical conductor 20 (blue colored), a dielectric 50 (white colored) forming a capacitor is arranged so as to electrically (DC) isolate the first cylindrical conductor 10 and the second cylindrical conductor 20 from each other. In a layered structure, the number of cylindrical conductors should be optimized, and either a conductor or a dielectric may be placed at the innermost center.

Thicknesses of the first cylindrical conductors 10 (orange colored), second cylindrical conductors 20 (blue colored) and dielectrics 50 (white colored) are varied so as to mitigate the skin effect.

In the coaxial cable described above, a layered structure of cylindrical conductors 10 and 20 may be made of hollow metal cylinders. That is, multiple hollow metal cylinders may be assembled in a coaxial shape and dielectrics may be inserted between the metal cylinders, simultaneously realizing a coil and capacitor in a cable structure. This configuration may be used for simultaneous realization of a coil and capacitor in power supply equipment or power collection equipment for an electric vehicle utilizing magnetic-induction based power transfer, contributing to cost reduction and miniaturization of a wireless power transfer system in a vehicle or railway vehicle.

The cylindrical conductors 10 and 20 have a form of layered hollow metal cylinders with a given length and include a capacitor of a given capacitance at the connection part of the coaxial cable, making it easy to build various types of circuits. In particular, the coaxial cable realizes distributed capacitance so as to minimize power loss therein, and thicknesses of the cylindrical conductors 10 and 20 and dielectrics 50 are varied to mitigate the skin effect.

The cylindrical conductors 10 and 20 may correspond to two or more hollow metal cylinders. A pair of hollow metal cylinders are open in terms of DC electricity and are arranged so as to overlap each other, producing a preset capacitance. As dielectrics are placed between metal cylinders, inductance is produced by metal cylinders and capacitance is produced between metal cylinders at the same time. To mitigate the skin effect, thicknesses of the metal cylinders and dielectrics may be varied.

For example, referring to FIGS. 1 and 2, in the coaxial cable having nine layered metal cylinders, dielectrics 50 are arranged between first cylindrical conductors 10 and second cylindrical conductors 20 so as to form a capacitor, and the innermost layer 60 is a dielectric layer.

At one end of the coaxial cable with nine layered metal cylinders, portions of the first cylindrical conductors 10 are protruded to form a first protruding connection part 30 connectable in series or parallel to an external circuit. At the other end of the coaxial cable, portions of the second cylindrical conductors 20 are protruded to form a second protruding connection part 40 connectable in series or parallel to an external circuit.

A hole 70 is formed in the first protruding connection part 30 protruding from one end of the coaxial cable and in the second protruding connection part 40 protruding from the other end of the coaxial cable. The first protruding connection part 30 and the second protruding connection part 40 may be connected in series or parallel to an external circuit through the holes 70 in an electrically isolated manner.

FIG. 4 illustrates an equivalent structure for the coaxial cable having layered metal cylinders, and FIG. 5 illustrates an equivalent circuit for the coaxial cable. In FIG. 5, $L_1, L_2 \ldots L_n$ indicate inductances of n first cylindrical conductors 10, $L'_1, L'_2 \ldots L'_n$ indicate inductances of n second cylindrical conductors 20, and $C_1 \ldots C_2$ indicate capacitances due to the dielectrics 50 arranged between the first and second cylindrical conductors 10 and 20. Here, the value of each C is given by Equation 1.

$$C = \varepsilon_r \frac{A}{d} [F] \qquad \text{[Equation 1]}$$

Here, A denotes the cross sectional area of a cylindrical conductor, d denotes the distance between cylindrical conductors, and $\in_r$ denotes the permittivity of a dielectric arranged between cylindrical conductors.

The coaxial cable having the above layered structure, unlike a related art technique requiring installation of a separate capacitor on the line to compensate for line voltage drop due to inductance (L) along the line, can minimize current loss in a transmission line through generation of a resonant frequency compensating for line voltage drop due to self-inductance L of the line without use of a separate capacitor.

Figure 6:
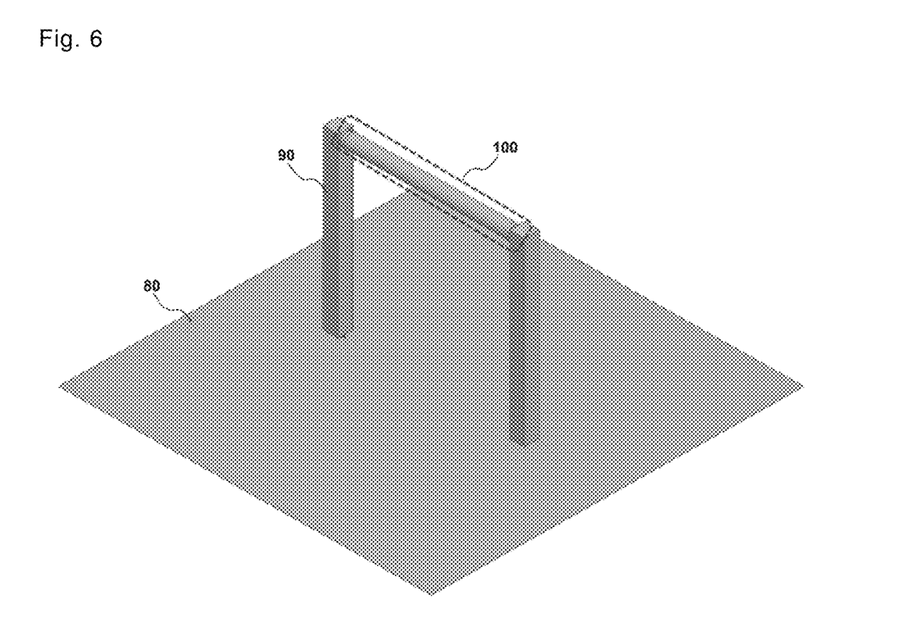
FIG. 6 illustrates simulation arrangement for capacitance components of the coaxial cable having a layered structure shown in FIG. 1.
Figure 7:
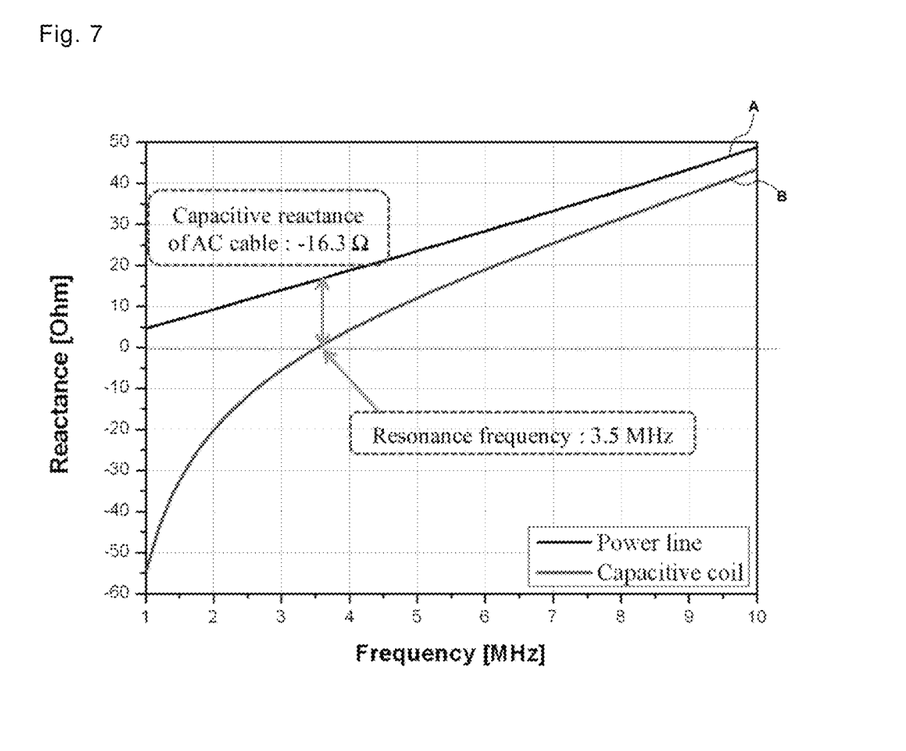
FIG. 7 illustrates a result of simulation using arrangement shown in FIG. 6 for capacitance of the coaxial cable having a layered structure.

FIG. 6 illustrates simulation arrangement for capacitance components of the coaxial cable having a layered structure shown in FIG. 1, and FIG. 7 illustrates a result of simulation using arrangement shown in FIG. 6 for capacitance of the coaxial cable having a layered structure.

Simulation setup was made to compute the capacitance value of the coaxial cable having a layered structure as shown in FIG. 6. It is possible to estimate the capacitance value by comparing the imaginary part of impedance obtained when a regular power line is connected between two port poles 90 built on a PEC ground plane 80 with the imaginary part of impedance obtained when a coaxial cable 100 of the present invention between the two port poles 90. Specifically, in FIG. 6, the coaxial cable 100 has two layers of conductors, the conductor thickness is 0.5 mm, the distance between conductors is 0.5 mm, the cable length is 45 cm, and the cable diameter is 4 cm.

A description is given of the result of capacitance simulation of the coaxial cable having a layered structure with reference to FIG. 7.

In FIG. 7, the horizontal axis indicates the frequency in MHz and the vertical axis indicates the reactance in ohms. Changes in the reactance component of a conventional power line having metal conductors of the same size are represented by a black line labeled 'A', and changes in the reactance component of a coaxial cable for a capacitive coil are represented by a red line labeled 'B'.

The simulation result is described with reference to a comparison between the black line A indicating changes in the reactance component of the conventional power line having metal conductors of the same size and the red line B indicating changes in the reactance component of the coaxial cable having a layered structure for a capacitive coil.

As described before in relation to the configuration of the coaxial cable for a capacitive coil, capacitive reactance $X_c$ of a minus sign (−) is introduced to the coaxial cable by dielectrics arranged between layered metal cylinders, and hence the change in the reactance component falls from a state indicated by the black line A to a state indicated by the red line B. The resonant frequency where the reactance becomes zero in the red line B is 3.5 MHz. Change in the reactance component at the resonant frequency of 3.5 MHz is −16.3Ω (the change of capacitive reactance $X_c$ due to a fall from the black line A to the red line B).

That is, the capacitive reactance $X_c$ of the coaxial cable having a layered structure of the present invention may be given by Equation 2.

$$X_C = \frac{1}{\omega C} = 16.3 \quad \text{[Equation 2]}$$

Substituting the value of the resonant frequency into Equation 2 produces total capacitance of the coaxial cable, which is given by Equation 3.

$$C_{total} = 2.79 \text{ [nF]} \quad \text{[Equation 3]}$$

As described above, through simulation, it is possible to obtain quantitative information on the capacitive reactance, resonant frequency, and capacitance of the coaxial cable having a layered structure for a capacitive coil.

Figure 8:
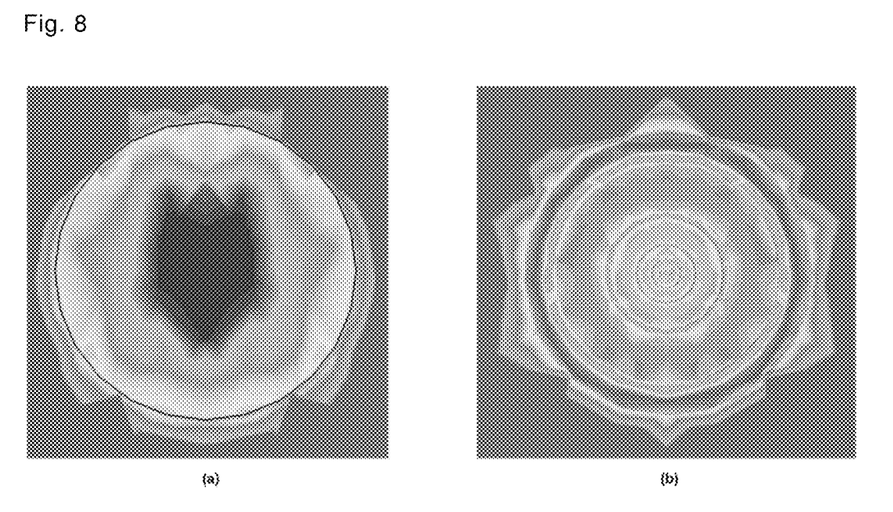
FIG. 8 illustrates a simulation result for current distribution due to the skin effect in the coaxial cable in FIG. 1 whose inner and outer conductors have different widths.

FIG. 8 illustrates a simulation result for current distribution due to the skin effect in the coaxial cable whose inner and outer conductors have different thicknesses.

In FIG. 8, part (a) indicates current distribution at a cross section of the conventional power line, and part (b) indicates current distribution at a cross section of the proposed coaxial cable for a capacitive coil. Red and yellow colors represent high current density and a blue color represents low current density.

Part (a) of FIG. 8 shows that, in the conventional power line, current density is high only at the outer region of the conductor owing to the skin effect. Part (b) shows that in the coaxial cable whose inner and outer conductors have different thicknesses, current density is more uniform in comparison to the conventional power line and the skin effect is mitigated.

Figure 9:
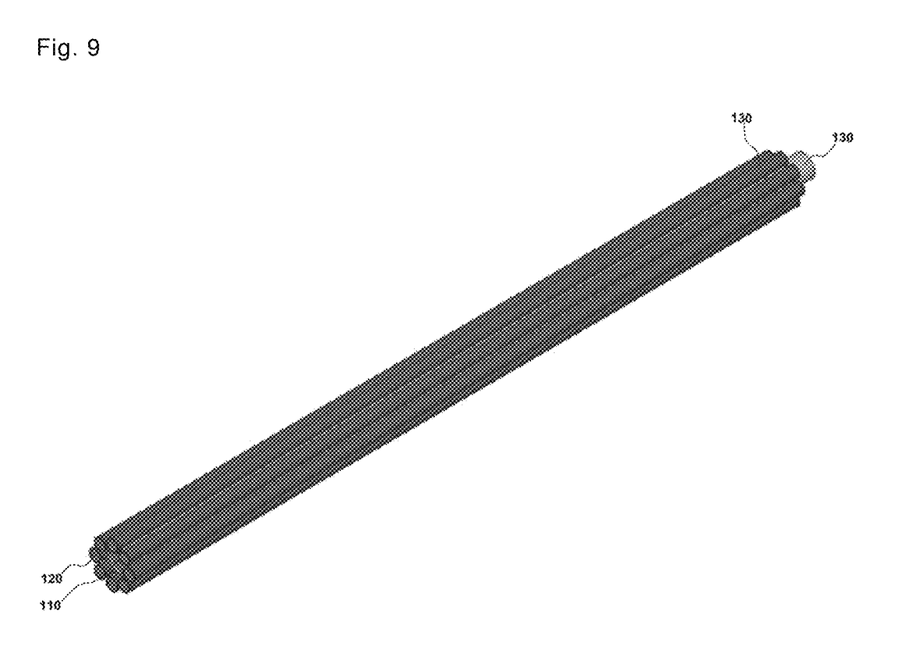
FIG. 9 is a three-dimensional perspective view of a cable for a capacitive coil having separate conductors according to another embodiment of the present invention.
Figure 10:
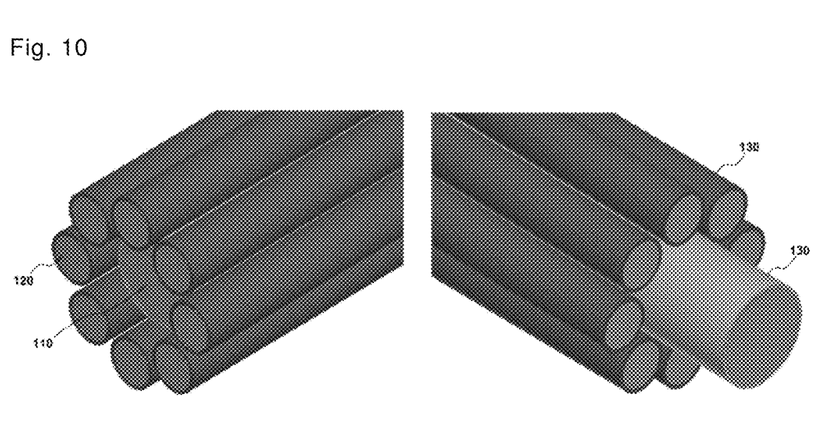
FIG. 10 illustrates structures of both ends of the cable having separate conductors shown in FIG. 9.
Figure 11:
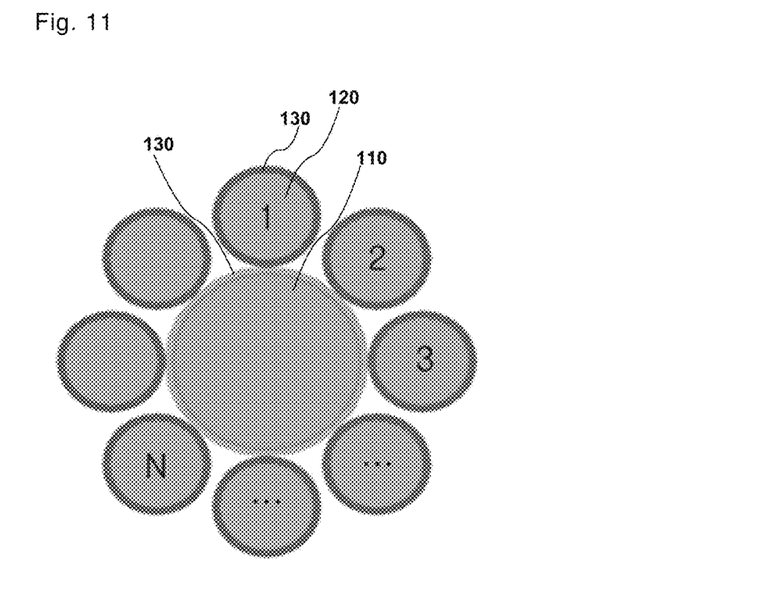
FIG. 11 is a cross sectional view of the cable having separate conductors.
Figure 12:
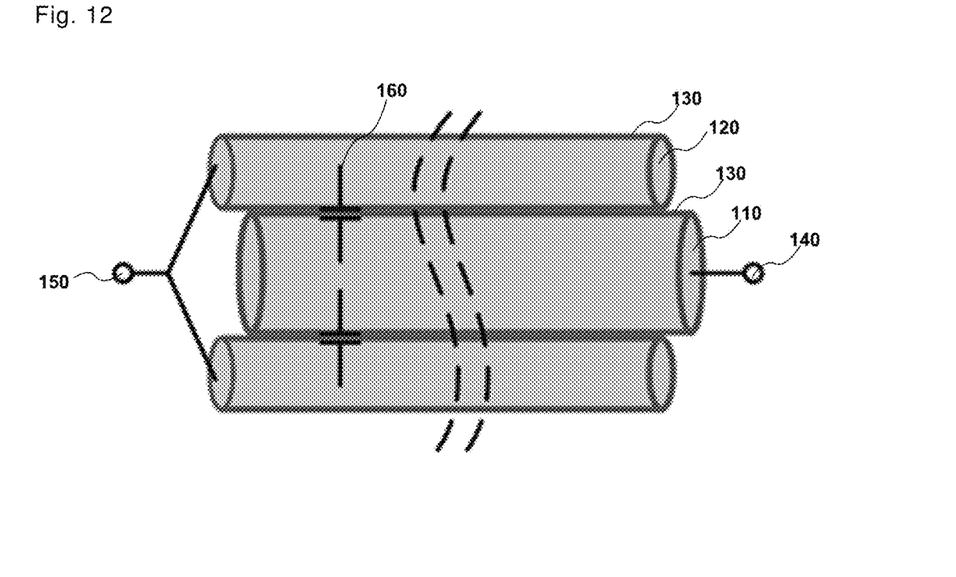
FIG. 12 is an x-axis sectional view of the cable having separate conductors shown in FIG. 11.
Figure 13:
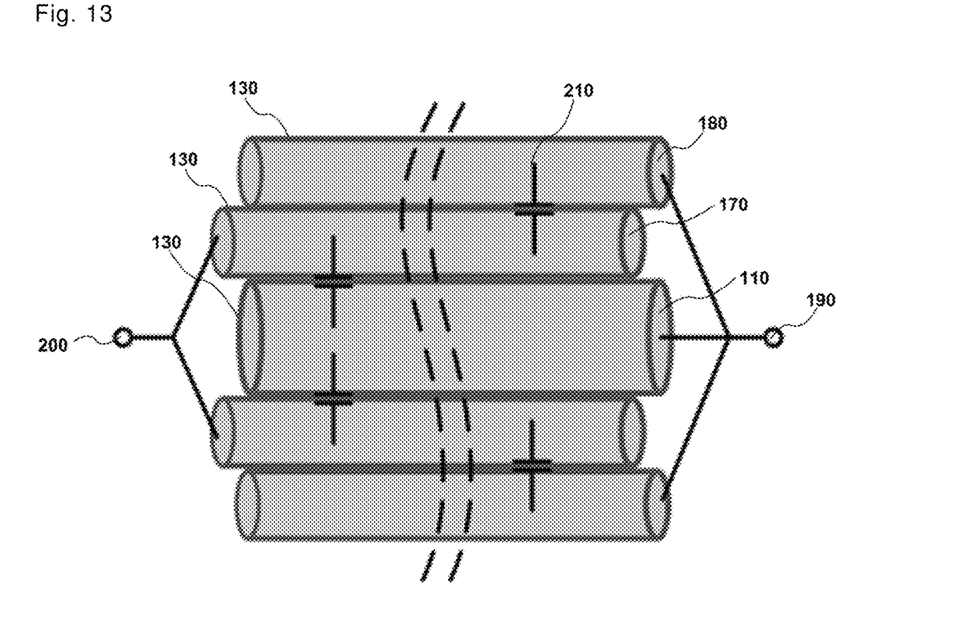
FIG. 13 is an x-axis sectional view of a cable having separate multi-layered conductors.

FIG. 9 is a three-dimensional perspective view of a cable for a capacitive coil having separate conductors according to another embodiment of the present invention; FIG. 10 illustrates structures of both ends of the cable having separate conductors shown in FIG. 9; FIG. 11 is a cross sectional view of the cable having separate conductors; FIG. 12 is an x-axis sectional view of the cable having separate conductors shown in FIG. 11; and FIG. 13 is an x-axis sectional view of a cable having separate multi-layered conductors.

As shown in FIGS. 9 to 11, the cable having separate conductors of the present invention includes an inner conductor 110 and multiple outer conductors 120 surrounding the inner conductor 110.

The inner conductor 110 at the center of the cable may be a single solid wire, a bundle of wires, or multiple bundles of wires. The outer conductors 120 surrounding the inner conductor 110 may be solid wire or stranded wire.

The inner conductor 110 at the center and the outer conductors 120 surrounding the inner conductor 110 are each enclosed by dielectrics 130 and are separated from each other.

As shown in FIG. 12, at one end 150 of the cable, the outer conductors 120 surrounding the inner conductor 110 are interconnected. At the other end 140 of the cable, the inner conductor 110 and the outer conductors 120 surrounding the inner conductor 110 are separated from each other.

That is, the inner conductor 110 is used for connection at the end 140 of the cable and the outer conductors 120 surrounding the inner conductor 110 are used for connection at the end 150 of the cable. Hence, capacitances 160 can be generated between the inner conductor 110 at the center and the outer conductors 120.

As shown in FIG. 13, a cable having multi-layered separate conductors may be configured to include an inner conductor 110, multiple first outer conductors 170 surrounding the inner conductor 110, and multiple second outer conductors 180 surrounding the first outer conductors 170.

The inner conductor 110 at the center, the first outer conductors 170 surrounding the inner conductor 110, and the second outer conductors 180 surrounding the first outer conductors 170 are each enclosed by dielectrics 130.

In FIG. 13, the second outer conductors 180 surrounding the first outer conductors 170 are connected together at one end 190 of the cable, and the first outer conductors 170 surrounding the inner conductor 110 are connected together at the other end 200 of the cable. Hence, the inner conductor 110 at the center, the first outer conductors 170 surrounding the inner conductor 110, and the second outer conductors 180 surrounding the first outer conductors 170 are separated from each other at both ends of the cable.

The inner conductor 110 and the second outer conductors 180 surrounding the first outer conductors 170 are interconnected at the end 190 of the cable, and the first outer conductors 170 surrounding the inner conductor 110 are interconnected. Thereby, capacitances 210 can be generated between the inner conductor 110 at the center and the first outer conductors 170 and between the first outer conductors 170 and the second outer conductors 180.

As shown in FIG. 13, at the outside of the first outer conductors 170, second to n-th outer conductors may be formed in a multi-layered structure, and the second to n-th outer conductors may each be enclosed by dielectrics. In this configuration, capacitances can be generated by dielectrics between the inner conductor 110 and the first outer conductors 170, by dielectrics between the first outer conductors 170 and the second outer conductors 180, . . . , and by dielectrics between the n−1 th outer conductors and the n-th outer conductors.

In the cable, the inner conductor 110, and the first to n-th outer conductors formed in a multi-layered structure are electrically separated from each other.

In the cable including the inner conductor 110 and the first to n-th outer conductors formed in a multi-layered structure, an external circuit is connected alternately to conductors of one layer at one end of the cable and to conductors of the next layer at the other end.

Figure 14:
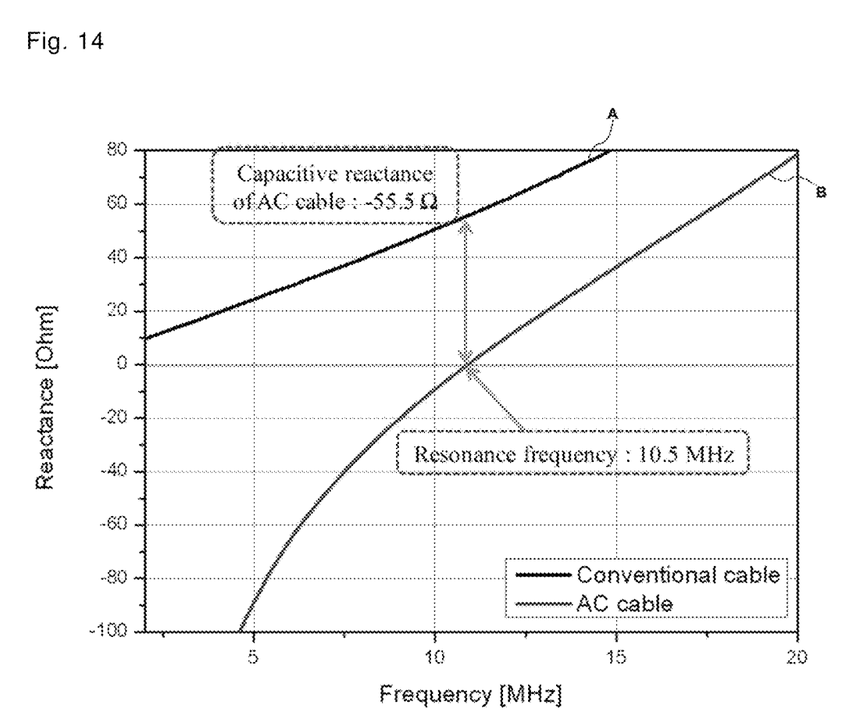
FIG. 14 illustrates a result of capacitance simulation of the cable having separate conductors.

FIG. 14 illustrates a result of capacitance simulation of a cable having separate conductors. Simulation setup is the same as in FIG. 6. The cable used in the simulation includes one inner conductor and eight outer conductors. The length of the cable is 45 cm, the diameter of the inner conductor is 14 mm, and the diameter of the outer conductor is 42 mm.

In FIG. 14, the horizontal axis indicates the frequency in MHz and the vertical axis indicates the reactance in ohms. Changes in the reactance component of a conventional power line having metal conductors of the same size are represented by a black line labeled 'A', and changes in the reactance component of a cable having separate conductors for a capacitive coil are represented by a red line labeled 'B'.

The simulation result is described with reference to a comparison between the black line A indicating changes in the reactance component of the conventional power line having metal conductors of the same size and the red line B indicating changes in the reactance component of the cable having separate conductors for a capacitive coil.

As described before in relation to the configuration of the cable having separate conductors for a capacitive coil, capacitive reactance $X_c$ of a minus sign (−) is introduced to the cable by dielectrics enclosing the inner conductor and outer conductors, and hence the change in the reactance component falls from a state indicated by the black line A to a state indicated by the red line B. The resonant frequency where the reactance becomes zero in the red line B is 10.5 MHz. The change in the reactance component at the resonant frequency of 10.5 MHz is −55.5Ω (the change of capacitive reactance $X_c$ due to a fall from the black line A to the red line B).

That is, the capacitive reactance $X_c$ of the cable having separate conductors of the present invention may be given by Equation 4.

$$X_C = \frac{1}{\omega C} = 55.5 \qquad \text{[Equation 4]}$$

Substituting the value of the resonant frequency into Equation 4 produces total capacitance of the cable, which is given by Equation 5.

$$C_{total} = 0.27 \text{ [nF]} \qquad \text{[Equation 5]}$$

As described above, through simulation, it is possible to obtain quantitative information on the capacitive reactance, resonant frequency, and capacitance of the cable having separate conductors for a capacitive coil.

Although embodiments of the present invention have been described in detail hereinabove, it should be understood that many variations and modifications of the basic inventive concept described herein will still fall within the spirit and scope of the present invention as defined in the appended claims.

DESCRIPTION OF REFERENCE SYMBOLS

10: first cylindrical conductors
20: second cylindrical conductors
30: first protruding connection part
40: second protruding connection part
50: dielectric

What is claimed is:

1. A transmission line for a capacitive coil, comprising:
a plurality of first cylindrical conductors;
a plurality of second cylindrical conductors arranged alternately with the first cylindrical conductors in a layered structure; and
dielectrics arranged between the first cylindrical conductors and the second cylindrical conductors,
wherein a first protruding connection part connectable to an external circuit is formed at one end of the first cylindrical conductors towards one end of the transmission line and a second protruding connection part connectable to an external circuit is formed at one end of the second cylindrical conductors towards the other end of the transmission line.

2. The transmission line of claim 1, wherein holes are formed respectively at the first protruding connection part and the second protruding connection part so that an external circuit is connected through the holes in an electrically isolated manner.

3. The transmission line of claim 1, wherein, among the first cylindrical conductors and the second cylindrical conductors, thicknesses of inner cylindrical conductors and outer cylindrical conductors are varied so as to mitigate the skin effect.

4. A transmission line for a capacitive coil, comprising:
an inner conductor at the center of a cable;
a plurality of first outer conductors surrounding the inner conductor; and
dielectrics enclosing the inner conductor and the first outer conductors,
wherein a plurality of second to n-th outer conductors are formed in a multi-layered structure outside the first outer conductors and the second to n-th outer conductors are individually enclosed by dielectrics,
wherein the inner conductor and the first to n-th outer conductors in a multi-layered structure are electrically separated from each other, and
wherein, among the inner conductor and the first to n-th outer conductors in a multi-layered structure, an external circuit is connected alternately to conductors present at one layer at one end of the cable and to conductors present at the next layer at the other end of the cable.

5. The transmission line of claim 4, wherein the dielectrics enclosing the inner conductor and the first to n-th outer conductors in a multi-layered structure generates capacitances between conductors at one layer and conductors at the next layer.

* * * * *